2,680,104

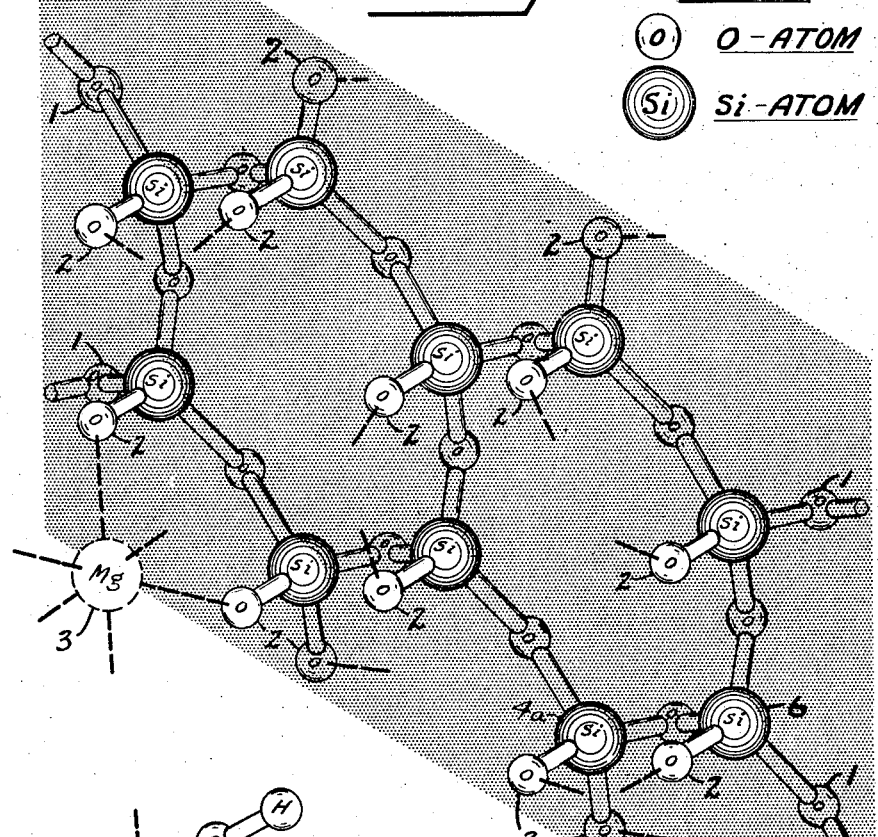
Fig. I  LEGEND
○ O-ATOM
Si Si-ATOM
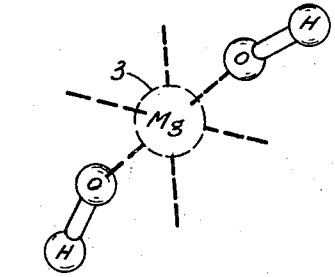
Fig. II
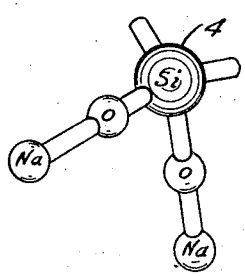
Fig. III
Fig. IV
INVENTOR.
David E. Cordier
BY
Marshall & Marshall
ATTORNEYS Patented June 1, 1954

UNITED STATES PATENT OFFICE 2,680,104

PRODUCTION OF POLYMERIZED POLYESTER RESINS CONTAINING AN AMINE ALDEHYDE TREATED FILLER

David E. Cordier, Toledo, Ohio, assignor, by mesne assignments, to Allied Chemical & Dye Corporation, New York, N. Y., a corporation of New York Application April 20, 1951, Serial No. 222,025

13 Claims. (Cl. 260—39)

The invention relates to the production of a molding composition that gives molded articles having improved water resistance and electrical properties.

A polymerizable unsaturated alkyd (i. e., a polymerizable unsaturated polyhydric alcohol-polycarboxylic acid polyester) is highly advantageous as a starting material for the production of hardened synthetic resins in that it is resinous in character before polymerization, and is fusible at a temperature at which polymerization is not rapid. Other heat-hardenable compositions, such as urea-formaldehyde and phenol-formaldehyde compositions, are much more difficult to fabricate because they do not exist as plastic resins at temperatures much below their hardening temperatures. Since a heat-hardenable composition can be shaped only while it is in a fused condition, the failure of other heat-hardenable compositions to reach a fused state below their hardening temperatures is a great handicap in fabricating operations. By the time a urea-formaldehyde or phenol-formaldehyde composition has reached a fused state in a fabricating operation, its hardening already has begun, so that the hardening interferes with the shaping or molding of the composition.

Still other heat-hardenable compositions, such as diallyl esters, have low melting points or are liquids at room temperature, but have the disadvantage that they do not attain a resinous state until after hardening has begun. Such compositions cannot be handled satisfactorily in the resinous state that they attain after hardening has begun because the hardening, once it has started, is very difficult to stop. Because of the difficulty of controlling the hardening of compositions such as diallyl esters once the hardening has reached the stage at which the compositions are resinous, such compositions ordinarily are shaped only by the casting method, which is the sole method by which they can be handled in non-resinous liquid form.

The resinous state of a polymerizable polyester makes it possible to employ the polyester in a molding operation either alone or in admixture with a filler. A non-resinous liquid composition, such as a diallyl ester, cannot be used in a molding operation because it would be squeezed out of the filler and squirted out of the mold.

A saturated heat-hardenable polyester, such as glycerol phthalate, is hardened by esterification with elimination of water. A polyester that is hardened by esterification cannot be employed to make a molded article or other solid body because it is too difficult to remove water from the interior of such a solid body in order to complete the hardening. Even urea-formaldehyde and phenol-formaldehyde compositions tend to give off small amounts of volatiles as they are hardened in a mold. In contrast, a polymerizable unsaturated polyester hardens by polymerization without the evolution of volatiles.

For the foregoing reasons, a polymerizable unsaturated polyester is particularly well adapted for many industrial uses. However, a polymerizable unsaturated polyester has certain physical and chemical properties which leave something to be desired. For example, articles made from a molding composition containing such a polyester tend to have inferior water resistance and electrical properties.

The principal object of the invention is the production of a novel polymerizable polyester molding composition that gives molded articles having improved water resistance and electrical properties. More specific objects and advantages are apparent from the description, in which reference is had to the accompanying drawing.

Figure I of the drawing is a partial view in perspective of a crystal model illustrating the basic silicon-oxygen atomic arrangement believed to exist in the crystalline structure of a mineral preferred for use in the invention.

Figures II, III and IV are each a view of one of the atomic positions shown in the crystal model of Figure I, illustrating a modification of the atomic arrangement with respect to the particular atomic position shown.

This specific drawing and the specific description that follows merely disclose and illustrate and are not intended to limit the scope of the invention.

Among the most useful articles produced from synthetic resins are those in which a filler is present. The filler may be a cellulosic material such as alpha cellulose, or a mineral material in the form of small granules, such as clay, mica, silica or ground glass, or a mineral material in fiber form such as glass fiber or asbestos. Although the presence of a filler in a hardened synthetic resin may cause a substantial improvement in strength, the filler may still leave much to be desired in the electrical properties and water resistance of the hardened composition. For example, cellulose fibers are known to be useful as fillers in certain synthetic resins and to impart great strength to such resins because the resins adhere well to such fibers, but the natural attraction for moisture possessed by cellulose fibers limits the possibility of obtaining good water resistance and electrical properties in synthetic resins containing such fibers. On the other hand, mineral fillers, i. e., fibrous or non-fibrous fillers derived from a mineral source, do not possess a natural attraction for moisture as great as that of cellulose fibers.

Even impregnating a cellulose filler with a melamine-formaldehyde resin before it is used in a polymerizable unsaturated polyester molding composition does not overcome the natural affinity of the cellulose fibers for moisture. However, a slight improvement in the water resistance and electrical properties of articles molded from a cellulose filled polymerizable unsaturated polyester molding composition can be obtained by pre-impregnation of the filler with a melamine-formaldehyde resin, because a cellulose filler is capable of absorbing a substantial proportion of a melamine-formaldehyde resin.

The slight improvement in the water resistance and electrical properties of articles molded from a cellulose - filled polymerizable unsaturated polyester molding composition that can be obtained by pre-impregnating the filler with a melamine-formaldehyde resin is not generally obtainable by the use of such a resin to pre-treat the filler in a mineral-filled polymerizable unsaturated polyester molding composition.

For example, the use of a melamine-formaldehyde resin to pre-treat a glass fiber filler for incorporation in a polymerizable unsaturated polyester molding composition does not appear to give molded articles having appreciably better water resistance and electrical properties than the molded articles produced from a polymerizable unsaturated polyester molding composition containing an untreated glass fiber filler.

The fact that the melamine-formaldehyde resin pre-treatment of a glass fiber filler fails to improve the water resistance or electrical properties of articles molded from a polymerizable unsaturated polyester molding composition in which the filler is used is believed to be due to the inability of a mineral filler to absorb the melamine-formaldehyde resin.

The present invention is based upon the discovery that although a filler comprising fibers of crystalline fibrous silicates consisting essentially of anhydrous silicates of divalent metals, like other mineral fillers, is incapable of absorbing a melamine-formaldehyde resin and can only be coated with a thin film of the resin, nevertheless, the use of a melamine-formaldehyde resin for coating a filler comprising fibers of crystalline fibrous silicates consisting essentially of anhydrous silicates of divalent metals produces a very important improvement in the water resistance and electrical properties of articles molded from a polymerizable unsaturated polyester molding composition in which such a coated filler is used, in contrast to the insignificant improvement in the water resistance and electrical properties of articles molded from a cellulose-filled polymerizable unsaturated polyester molding composition that is produced by impregnating the cellulose filler with a melamine-formaldehyde resin.

The remarkable improvement in the water resistance and electrical properties of molded articles that is obtained in the practice of the present invention has been demonstrated as follows:

A molding composition of the invention was prepared as follows:

A reaction mixture of a heterocyclic polyamine (109 grams of melamine), mormalin (210 grams of a 37 per cent commercial aqueous formaldehyde solution) and water (400 grams) was heated to a temperature of 80 degrees C. As soon as a clear solution was formed the pH was adjusted to 6.7 by adding lactic acid (0.7 cc. of a 10 per cent aqueous solution), and the reaction was continued for a total time of ten minutes. The resin solution was then cooled to 60 degrees C. and diluted with water (3200 grams). The resulting dilute resin solution was then absorbed on a filler (1638 grams of anthophyllite fibers) in a Hobart mixer and then dried on trays at 160 degrees F. for approximately 48 hours. The resin-coated filler so obtained was placed on a standard 12 mesh screen, which was shaken to remove all particles fine enough to pass through the screen. The residue (100 parts) remaining on the screen was then mixed in a Banbury mixer with a polymerizable binder, consisting of 114.3 parts of a polymerizable unsaturated polyester (prepared by esterifying 1.0 mol of ethylene glycol with 0.2 mol of phthalic anhydride and 0.8 mol of maleic anhydride by the procedure hereinafter described to an acid number of 35) and 44.4 parts of a polymerizable unsaturated liquid monomer (diallyl diglycolate); 6.35 parts of "Luperco ATC" catalyst (a paste consisting of 50 per cent benzoyl peroxide and 50 per cent tricresyl phosphate); 10 parts of a lubricant (zinc stearate); and 235 parts of kaolin. The mixing was continued until a soft, homogeneous dough was obtained. The material was then passed through warm rubber rolls to form sheets of a thickness of approximately ⅛ inch. The resulting molding composition is hereinafter referred to as composition A.

For the sake of comparison, the procedure described in the preceding paragraph was repeated except that the filler employed did not comprise resin-coated anthophyllite fibers prepared in accordance with the present method, but comprised 100 parts of ordinary anthophyllite fibers. The resulting molding composition is hereinafter referred to as composition B, and is the control composition used in the tests described below.

Samples of the sheets of compositions A and B were molded for one minute under one to four tons of pressure per square inch of projected area in a mold heated with steam at 75 lbs. gauge pressure to produce small disks (2 inches in diameter) suitable for testing water resistance. Water resistance varies with the amount of moisture that an article is capable of absorbing because the degree of deterioration upon exposure to moisture varies with the amount of moisture absorbed. The disks were immersed in water, and the water absorption was measured as the gain in weight (in grams) during immersion. In Table 1 below, the water absorption is given for tests in which test pieces made from molding composition A (column 2) and control molding composition B (column 7) were immersed in boiling water for one hour (line 1), and in cold water for 24 hours (line 2) or 48 hours (line 3) or 7 days (line 4). The results for molding compositions $A_1$ and $A_2$) which were prepared in the same manner as composition A (except that the resin-treated filler used in composition $A_1$ consisted of particles small enough to pass through a 20 mesh screen and large enough to be retained on a 28 mesh screen, while the resin treated filler used in composition $A_2$ consisted of particles small enough to pass through a 28 mesh screen)

are also included (columns 3 and 4) in Table 1. Compositions A₃ and A₄, for which the water resistance results are also included in Table 1 (columns 5 and 6), were prepared by the same procedure as composition A except that the per cent of melamine-formaldehyde resin on the anthophyllite fibers is higher (i. e., the proportion of fibers that is coated with the melamine resin is only 728 grams), and the screen sizes of the treated filler are "on 28" and "through 28," respectively.

The Barcol hardness of a disk molded from each composition was determined both before (line 5) and after (line 6) the disk was immersed in boiling water for one hour. Standard "Barcol" hardness apparatus was employed in this test, and hardness was read from a dial gauge which gave hardness readings as compared to an arbitrary standard.

TABLE 1

| Col. 1 | Col. 2 | Col. 3 | Col. 4 | Col. 5 | Col. 6 | Col. 7 |
|---|---|---|---|---|---|---|
| | Molding Composition | | | | | |
| | A | A₁ | A₂ | A₃ | A₄ | B (control) |
| 1. Abs. boiling water, 1 hour | .040 | .035 | .037 | .040 | .051 | .057 |
| 2. Abs. cold water, 24 hours | .017 | .010 | .014 | .020 | .019 | .029 |
| 3. Abs. cold water, 48 hours | .028 | .018 | .024 | .024 | .032 | .043 |
| 4. Abs. cold water, 7 days | .059 | .039 | .049 | .051 | .065 | .088 |
| 5. Barcol Hardness (original) | 66 | 66 | 66 | 59 | 62 | 65 |
| 6. Barcol Hardness (after boiling) | 54 | 56 | 54 | 44 | 45 | 48 |

As the results in Table 1 indicate, a molding composition of the invention (A, A₁, A₂, A₃ or A₄) in which the filler comprises crystalline silicate fibers (anthophyllite fibers) coated with a melamine-formaldehyde reaction product can be molded to produce articles which absorb considerably less water than articles molded from an unsaturated polyester molding composition in which the filler comprises uncoated crystalline silicate fibers (ordinary anthophyllite fibers) (control B). Furthermore, after exposure to high humidity, the Barcol hardness of articles molded from a composition of the invention is at least as good as that of articles molded from a composition comprising an ordinary untreated crystalline silicate fibrous filler. In fact, the resistance to hydrolysis of articles molded from a composition of the invention is so superior that such articles show better retention of electrical properties after exposure to high humidity than articles molded from a similar composition which comprises an ordinary untreated crystalline silicate fibrous filler. A comparison of the electrical properties of disks (⅛ inch thick and 4 inches in diameter) molded from compositions A₁ and A₂ with the electrical properties of disks molded from control composition B is shown in Table 2 below.

TABLE 2

| | Molding composition | | |
|---|---|---|---|
| | A₁ | A₂ | B (control) |
| Dielectric constant (60 cycles) | 5.72 | 5.78 | 6.68 |
| Dielectric constant (10⁶ cycles) | 4.90 | 4.81 | 4.85 |
| Power factor (60 cycles) | .035 | .036 | .060 |
| Power factor (10⁶ cycles) | .019 | .020 | .032 |
| Arc resistance | 184 | 184 | 185 |

A molding composition of the invention that gives molded articles having improved water resistance and electrical properties comprises (a), as a binder, a polymerizable unsaturated polyhydric alcohol-polycarboxylic acid polyester and (b), as a filler therefor, fibers of crystalline fibrous silicates consisting essentially of anhydrous silicates of divalent metals, the fibers being coated with a thermosetting reaction product of formaldehyde and a substance whose molecule has a plurality of $NH_2$ groups each connected to a carbon atom contained in a heterocyclic ring, the carbon atom being connected by a double bond to an intracyclic nitrogen atom.

It has been found that the improved water resistance and electrical properties of articles molded from a polymerizable unsaturated polyester molding composition of the invention which contains a fibrous silicate filler that is coated with a thermosetting reaction product of formaldehyde and a substance whose molecule has a plurality of $NH_2$ groups each connected to a carbon atom contained in a heterocyclic ring, the carbon atom being connected by a double bond to an intracyclic nitrogen atom, are not obtained by merely incorporating the same proportion of such a thermosetting reaction product along with a fibrous silicate filler in the molding composition. That is, whereas the latter procedure may produce a minor improvement in properties, the former procedure (which comprises actually coating the fibers with the reaction product) produces such a great improvement in the water resistance and electrical properties as to be greatly disproportionate to the amount of reaction product employed to coat the fibers. It appears that any small improvement that may be brought about by simply incorporating the reaction product is due merely to the fact that the composition is diluted with a resin which has better resistance to hydrolysis and, unless the proportion of the resin is very high, the improvement is insignificant. On the other hand, with only a relatively small amount of resin actually coating the filler in a composition prepared in accordance with the present method, a disproportionately large improvement in properties is obtained. Thus, the coating of the fibrous silicate filler with the thermosetting reaction product is an essential feature of the present method whereby molding compositions having superior water resistance and electrical properties are obtained.

FILLER

The filler in a molding composition of the invention comprises fibers of crystalline fibrous silicates consisting essentially of anhydrous silicates of divalent metals, the fibers being coated with a thermosetting reaction product of formaldehyde and a substance whose molecule has a plurality of $NH_2$ groups each connected to a carbon atom contained in a heterocyclic ring, the carbon atom being connected by a double bond to an intracyclic nitrogen atom, in accordance with the present method. For the sake of brevity a filler comprising fibers of crystalline fibrous silicates consisting essentially of anhydrous silicates of divalent metals is hereinafter referred to as a "fibrous silicate filler."

Silicate minerals, both naturally occurring and synthetic, may have amorphous or crystalline structures. The silicate minerals used in the practice of the invention have crystalline structures and are therefore distinguished from glass, for example, which has an amorphous structure. Crystalline silicate mineral fibers are obtained from relatively few mineral families, the most important of which are the serpentines and the pyroboles. The most important fibrous serpentine is chrysotile, $3MgO.2SiO_2.2H_2O$, a hydrous silicate of magnesium, generally referred to simply as "asbestos" because of its industrial prevalence. The fibrous silicates of the invention are anhydrous and are therefore distinguished from the serpentines, such as chrysotile, which are hydrous silicates. A mineral sometimes classified as a fibrous pyrobole is crocidolite, $Na_2O.Fe_2O_3.2FeO.6SiO_2$ (with up to about one mol of $H_2O$ of hydration). The fibrous silicates used in the practice of the invention are silicates of divalent metals and are, therefore, distinguished from crocidolite which consists essentially of silicates of metals other than divalent metals.

Although the silicate fibers used in the practice of the invention may be fibers of any one or more of the crystalline fibrous minerals consisting of anhydrous silicates of divalent metals, practically the only members of this group which are available for industrial purposes are members of the pyrobole family. The pyroboles that are used in the practice of the invention are minerals consisting essentially of silicates of divalent metals having the general chemical composition: $MO.SiO_2$, wherein M is a divalent metal; but they may also contain small amounts of monovalent metals (e. g., sodium or potassium) and trivalent metals (e. g., ferric iron and aluminum). Examples of the fibrous silicates that may be used in the practice of the invention include:

Diopside, $(Ca, Mg)O.SiO_2$, essentially a silicate of calcium and magnesium;
Wollastonite, $CaO.SiO_2$, a relatively pure silicate of calcium;
Anthophyllite, $(Mg, Fe)O.SiO_2$, essentially a silicate of iron and magnesium, usually with a little aluminum;
Tremolite, $3MgO.CaO.4SiO_2$, a relatively pure silicate of magnesium and calcium;
Actinolite, $3(Mg, Fe)O.CaO.4SiO_2$, similar to tremolite, but containing at least 3 per cent by weight of FeO; and
Others descriptively named mountain leather and mountain cork.

The pyroboles are further classified in two distinct classes or families, viz. amphilboles and pyroxenes. According to J. W. Mellor in "Inorganic and Theoretical Chemistry" (Longmans, Green and Co., 1925), volume VI, pages 390 and 391, diopside and wollastonite are pyroxenes; and anthophyllite, tremolite and actinolite are amphiboles. The amphiboles have a different angle of cleavage (and are thereby distinguished) from the pyroxenes, which have substantially the same chemical composition as the amphiboles. Although the amphiboles and pyroxenes have certain differences, they also have certain fundamental similarities, such as the ability to undergo isomorphism, which is a characteristic of the fibrous silicates used in the practice of the invention. In general, the crystalline structure of such silicates is understood to comprise a number of substantially parallel silicon-oxygen chains having therebetween metallic ions which form cross-links between the chains through co-ordinate linkages with oxygen atoms in the chains, as represented by the following structure:

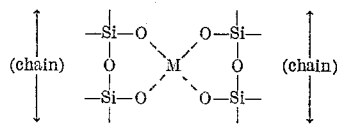

wherein M is a metallic ion having at least four co-ordinate valences (the co-ordinate bonds being represented by broken lines and the ordinary bonds by solid lines). Although the silicon-oxygen atomic arrangement in the chains of each of such silicates is analogous to the atomic arrangement of high polymer resins, in that it involves a number of repeating units, the specific arrangement of each silicate is different. The accompanying drawing illustrates in part the specific atomic arrangement in the molecular chains of the preferred fibrous silicates used in the practice of the invention, the amphiboles, and various modifications thereof resulting from isomorphous substitution.

Referring to the drawing in detail, Figure I is a partial view in perspective of a crystal model illustrating the silicon-oxygen atomic arrangement believed to exist in an amphibole chain. It can be seen from Figure I that an amphibole chain comprises a series of condensed rings having alternating silicon and oxygen atoms therein. Certain "intracyclic" oxygen (O) atoms 1 reach out at both ends of the portion of the chain illustrated in Figure I to form other rings (not shown), and certain "exocyclic" oxygen atoms 2 reach out to form co-ordinate bonds for the purpose of cross-linking the chain with other chains (not shown) through metallic ions, one of which might occupy the position 3 shown in dotted lines in Figure I. An example of a metallic ion which might occupy the position 3 shown in Figure I is the magnesium ion, which is capable of forming six co-ordinate bonds (as shown in Figure I). Other metallic ions which might occupy positions similar to the position 3 shown in Figure I include calcium, manganese, aluminum, ferrous and ferric ions.

In its fundamental aspects isomorphism relates to the ability of certain ions to replace other ions in a crystal structure without causing any essential alteration in the crystal structure. Thus in the case of tremolite, for example, which is a relatively pure silicate of magnesium and calcium, the crystal structure is understood to comprise magnesium and calcium ions, in an orderly arrangement, cross-linking the various chains of the amphibole through co-ordinate linkages. However, if another metal such as iron were present during the formation of tremolite crystals, certain of the positions which would normally be occupied by magnesium or calcium ions in the crystal may be occupied by ferrous or ferric ions. The phenomenon of isomorphism permits such substitution of a ferrous or ferric ion for a magnesium or calcium ion without causing any essential alteration in the crystal structure. The amount of iron so incorporated in the crystal structure may be quite substantial, or it may be so very slight that it appears merely as an impurity, depending upon the particular circumstances involved. In most instances, ferrous, manganese and magnesium ions are completely interchangeable; calcium ions may be replaced entirely by ferrous or magnesium ions; but aluminum and ferric ions may replace magnesium ions only to a limited extent. The chain structure of the pyroxenes is different from that of the amphiboles, but the isomorphic properties of the pyroxenes are about the same as the amphiboles.

Certain other ionic structures may occur in the crystalline fibrous silicates used in the practice of the invention, either as a part of the "standard" or most commonly known composition of the mineral or as a result of isomorphous substitution more radical in character than the mere substitution of one polyvalent metallic ion for another. The fundamental features of such structures are illustrated in Figures II, III and IV.

Figure II illustrates a modification of the ionic structure involving the position 3 of the metallic ion of Figure I. In Figure II, two of the co-ordinate valences of the metallic ion are satisfied by —OH groups. It is understood that combined water may thus be present in slight amounts in the crystalline structure. As hereinbefore mentioned the fibrous silicates of the invention are anhydrous silicates; but it is, of course, a practical impossibility to obtain an absolutely anhydrous silicate mineral. A small amount of combined water, for example, not more than about 0.2 mol per mol of $SiO_2$, is often present in the fibrous silicates of the invention. The fundamental or "standard" compositions of the pyroxenes do not indicate the presence of any combined water; but the most recently published "standard" compositions of the amphiboles indicate that a very small amount of combined water is present as a part of the basic crystal structure. In any event, the minute amount of combined water present may vary because of limited isomorphism; and the present fibrous silicates are anhydrous as contrasted to chrysotile ($3MgO.2SiO_2.2H_2O$), for example, in that the present fibrous silicates do not contain more than about 0.2 mol of $H_2O$ per mol of $SiO_2$. Fibrous silicates containing combined $H_2O$ in amounts above the foregoing maximum do not give the superior results obtained in the practice of the present invention.

Figure III illustrates a modification of the atomic structure surrounding a silicon atom 4 which might occupy a position such as that occupied by a silicon atom 4a of Figure I having two exocyclic oxygen atoms bonded thereto. In Figure III, one of the valences of each of the exocyclic oxygen atoms is satisfied by a sodium ion. It is understood that monovalent metallic ions such as sodium or potassium may thus be present in the crystalline structure. As hereinbefore mentioned the fibrous silicates of the invention are silicates of divalent metals; but they may contain small amounts of monovalent metals (e. g., sodium and potassium). It is, of course, well known that minerals are almost never chemically pure substances having an exact chemical formula. This is particularly true because of the phenomenon of isomorphism, since minerological classification is based upon crystalline structure, and isomorphism permits changes in the chemical composition which do not affect appreciably the crystalline structure. On the other hand, it is to be appreciated that the amount of sodium or potassium which may be present in the instant crystalline structure is relatively small since sodium or potassium is not understood to form cross-links between the chains. The presence of substantial amounts of sodium in the fibrous silicates appears to give a harmful effect, whatever may be the actual disturbance in the crystalline structure caused by the presence of sodium. The crystalline fibrous silicates of divalent metals used in the practice of the invention are, therefore, a mineralogical class of compounds which do not contain an appreciable amount of monovalent metals, e. g., which do not contain more than about 0.1 mol of $Na_2O$ per mol of $SiO_2$, as contrasted to crocidolite ($Na_2O.Fe_2O_3.2FeO.6SiO_2.XH_2O$). The fibrous silicates which contain no sodium are preferred, since the presence of sodium apparently reduces the acid resistance of the silicate fibers, and also reduces the improvement in electrical properties obtained in the practice of the invention.

Figure IV illustrates a modification of the ring structure which might be obtained by isomorphous substitution of an aluminum atom 5 for a silicon atom 6 of Figure I which forms a part of the ring structure in an amphibole chain. In Figure IV, each of the valences of the aluminum atom 5 is understood to be satisfied by a valence of an "intracyclic" oxygen atom. Aluminum atoms may be present in the crystalline structure either as a part of the cross-link, as shown in Figures I and II, or as a part of the ring structure of the chains, as shown in Figure IV. It is apparent that the amount of aluminum which may be present in the instant crystalline structure is relatively small, since such a trivalent metal either disturbs the co-ordinate bond arrangement in a cross-link (Figure II) or disturbs the oxygen atomic arrangement in the chain by reducing the number of "exocyclic" oxygen atoms (Figure IV). In any event, the presence of substantial amounts of a trivalent metallic atom such as the aluminum ion or the ferric ion in the fibrous silicates appears to produce a harmful effect, whatever may be the actual disturbance in the crystalline structure caused by the presence of such trivalent metallic ions. The crystalline fibrous silicates of divalent metals used in the practice of the invention are, therefore, a minerological class of compounds which do not contain an appreciable amount of trivalent metals, e. g., which do not contain more than about 0.1 mol of $Fe_2O_3$ or $Al_2O_3$ per mol of $SiO_2$.

In most fibrous silicates isomorphism is limited; i. e., partial replacement of one type of metallic ions in a mineral does not change the mineral per se but very substantial or complete replacement of such ions results in a new mineral. On the other hand, such new mineral may or may not be a member of the same mineral family. For example, partial replacement of magnesium ions by ferrous ions in anthophyllite may not yield a mineral that is not "anthophyllite," but a very substantial replacement of the magnesium ions by ferrous and ferric ions may yield a mineral known as "amosite," sometimes referred to as "iron-rich" anthophyllite. Amosite is recognized as a different mineral from anthophyllite, although it is also classified as an amphibole, and may be used in the practice of the invention if it consists of anhydrous silicates of divalent metals as hereinbefore defined. Although the crystalline structures of the other fibrous silicates used in the practice of the invention are somewhat different from the amphibole structure (e. g., the pyroxene structure has a simpler chain arrangement), the fundamental principles of isomorphism apply to these crystalline structures in like manner.

Although any fibrous silicate filler hereinbefore described may be coated in accordance with the present method and used in the production of molding compositions which can be molded to produce articles having superior water resistance and electrical properties, the degree to which such improvements may be brought about varies, of course, with the specific fibers employed. In general, the most pronounced improvement in water resistance is obtained when the filler used in the present method comprises amphibole fibers, particularly anthophyllite or tremolite, or wollastonite, a pyroxene fiber, and such fibers are therefore preferred in the practice of the invention. Since anthophyllite is the least expensive fibrous silicate, it is most desirably employed in the present method.

Fibrous silicates which may be used in the practice of the invention are available commercially in the form of the crude ore from the mine and in the form of fibers obtained by milling the ore (e. g., in a crusher) and then separating the fibers from the rock residue (e. g., by suction). Ordinarily, the fibers commercially available must be purified further for use in the invention, since such fibers usually contain a substantial amount of mineral impurities which may have a deleterious effect upon the properties of molding compositions produced in accordance with the present method. Silicate fibers sufficiently purified for the purposes of the present invention may be obtained by carrying out a simple flotation process, e. g., by introducing water continuously into the bottom of a vessel equipped with an overflow and containing the silicate fibers, so that the impurities remain at the bottom of the vessel and the purified fibers float out with the overflowing water. Tremolite fibers occur naturally in a very pure state and often require little or no further purification.

Fibrous silicates, as contrasted to massive silicates, occur in various fiber lengths ranging up to as much as 7 inches. The fiber lengths are reduced substantially in the ordinary milling process, although in some instances the initial fibers are of a short needle-like or rod-like structure. No particular fiber length is required for use in the practice of the invention. Ordinarily, the fibers, after being coated with a resin in accordance with the present method, as is hereinafter further described, are ground down to the size of ordinary fibrous fillers for use in molding compositions, i. e., the fiber lengths of groups No. 6 and No. 7 of the Canadian Asbestos classification, at which the fibers appear to the naked eye to be similar in form to sawdust.

HETEROCYCLIC POLYAMINE-FORMALDEHYDE REACTION PRODUCT

For the sake of brevity, a substance whose molecule has a plurality of NH₂ groups each connected to a carbon atom contained in a heterocyclic ring, said carbon atom being connected by a double bond to an intracyclic nitrogen atom, is hereinafter referred to as a "heterocyclic polyamine."

The term "heterocyclic ring" is used herein to include triazole, diazine and triazine rings. When the heterocyclic ring in a heterocyclic polyamine that may be reacted with formaldehyde to form a thermosetting reaction product which may be used to coat a fibrous silicate filler in accordance with the present method comprises a triazole ring, the heterocyclic polyamine may be, e. g., guanazole,

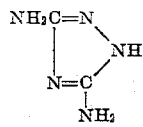

1-phenyl guanazole

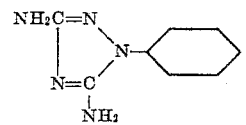

4-aminoguanazole

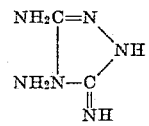

1-carbamyl guanazole

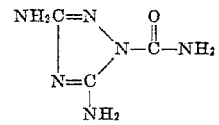

1-guanyl guanazole

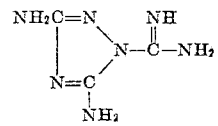

1-acetyl guanazole

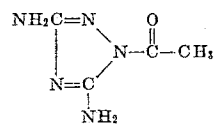

or 1-benzoyl guanazole

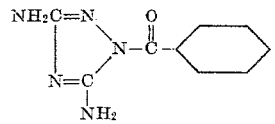

When the heterocyclic ring in a heterocyclic polyamine used in the practice of the invention comprises a diazine ring, the heterocyclic polyamine may be, e. g., a pyrimidine such as 2,4-diamino-6-hydroxy pyrimidine,

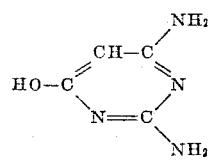

When the heterocyclic ring in a polyamine used in the practice of the invention comprises a triazine ring, the heterocyclic polyamine may be a substance whose molecule contains from one to three triazine rings, and has no functional groups attached to a triazine ring other than the amino groups (such as an amino triazine). The term "functional group" as used herein means any radical in a molecule of such a substance which may enter into undesirable side reactions that interfere with the reaction of formaldehyde with the amino triazine in the production of compositions of the invention (e. g., an OH group attached to a triazine ring may react with formaldehyde during the production of a thermosetting amino triazine-formaldehyde condensation product). A heterocyclic polyamine used in the practice of the invention that has one triazine ring in its molecule may be (1) a triamino triazine e. g., melamine,

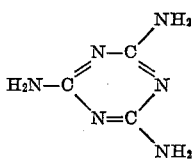

or a diamino triazine (i. e., a monoguanamine) having the general formula

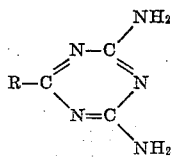

wherein R is a hydrogen atom, a saturated monovalent aliphatic hydrocarbon radical having from 1 to 18 carbon atoms, an aromatic hydrocarbon radical containing 1 benzene nucleus or containing 2 condensed benzene nuclei, a saturated or unsaturated cycloaliphatic hydrocarbon radical, or any of the foregoing radicals containing substituents such as aliphatic, cycloaliphatic, aromatic, alkoxy, aryloxy and acyl radicals. Thus, the monoguanamines used may have varying structures and may be of complex structure so long as they do not contain groups which interfere with the condensation reaction of formaldehyde with the guanamine in the practice of the invention. Such monoguanamines include:

Formoguanamine,

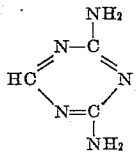

Acetoguanamine,

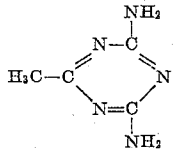

Propioguanamine,

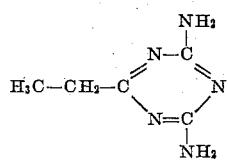

Butyroguanamine,

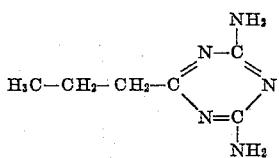

Benzoguanamine,

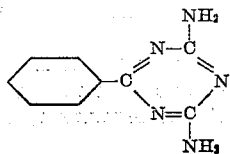

Phenylacetoguanamine,

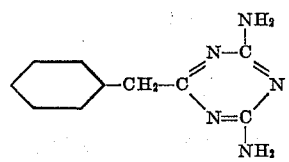

Delta-cyano-valeroguanamine,

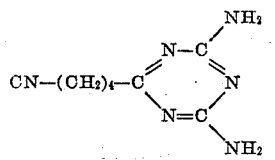

and monoguanamines obtained from the corresponding mononitriles containing as many as 18 carbon atoms, e. g., dodecano-, tetradecano-, or octadecano-nitrile.

A heterocyclic polyamine used in the practice of the invention that has two triazine rings in its molecule may be a diguanamine having the general formula

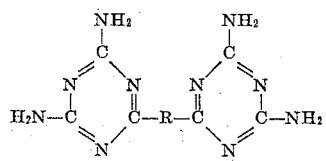

wherein R is a divalent hydrocarbon radical in which the shortest connection between the free valences is not more than eighteen carbon atoms in series and which contains no substituents or contains substituents such as aliphatic, cycloaliphatic, aromatic, alkoxy, aryloxy and acyl radicals, or may be a compound having said general formula that is substituted on not more than two exocylic nitrogen atoms, the substituents consisting of (a) not more than two monovalent aliphatic hydrocarbon radicals on each substituted nitrogen atom, each having not more than four carbon atoms, each having at least one hydrogen atom attached to the same carbon atom as the free valence, and each having not more than one unsaturation, any such unsaturation being an olefinic unsaturation in the beta-gamma position, (b) not more than one monovalent radical of the benzene series on each substituted nitrogen atom having not more than eight carbon atoms in which the free valence is connected to the nucleus, and (c) not more than one mono-alkoxy phenyl radical on each substituted nitrogen atom having not more than eight carbon atoms. Thus the diguanamines used may have varying structures and may be of complex structure so long as they do not contain groups which interfere with the condensation reaction of formaldehyde with the diguanamine in the practice of the invention. Such diguanamines include gamma - methyl - gamma - acetyl pimeloguanamine,

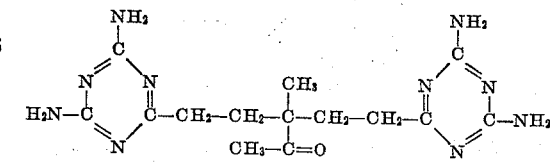

Sebacoguanamine,

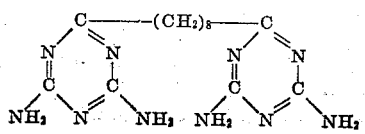

Adipoguanamine,

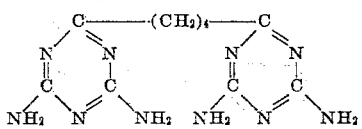

Bis-(4,6-diamino-2-triazinyl-ethyl) fluorene,

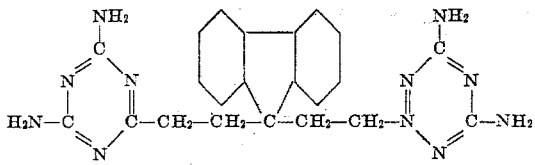

Gamma-isopropenyl-gamma-acetyl pimeloguanamine,

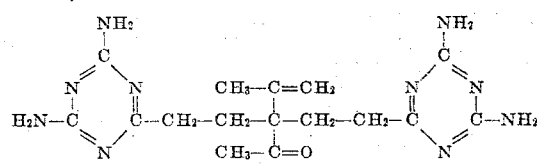

Sym.-diphenyladipoguanamine,

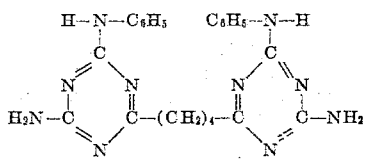

Phthaloguanamine,

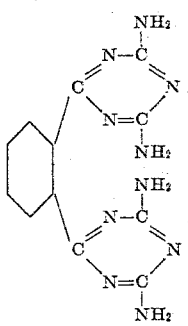

p,p'-Bis-2,4-diamino-6-triazinyl diphenyl,

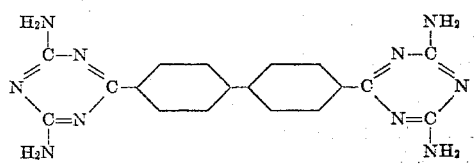

1,2-bis-2,4-diamino-6-triazinyl naphthalene,

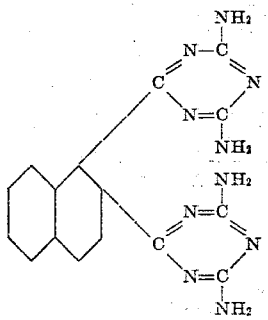

sym. - diphenylsebacoguanamine, sym. - di - p - phenetyladipoguanamine, sym. - di - o - tolyadipoguanamine, terephthaloguanamine and diguanamines obtained from nitriles such as 2,4-dicyanodiphenyl, 4,4'-dicyanodiphenyl methane, 4,4'-dicyanodiphenyl ethane, and 4,4'-dicyano-alpha, gamma-diphenyl propane.

A heterocyclic polyamine used in the practice of the invention that has three triazine rings in its molecule may be a triguanamine such as gamma-2,4-diamino-6-triazinyl-gamma- phenyl-pimeloguanamine.

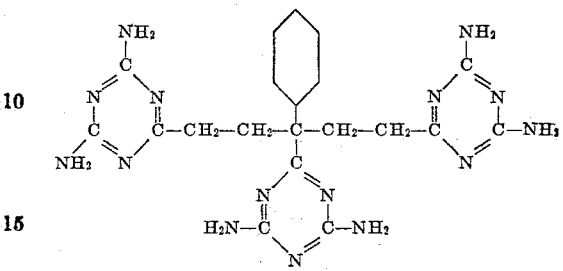

A guanamine which contains one or a plurality of 2,4-diamino-6-triazinyl radicals (e. g., a monoguanamine, diguanamine or triguanamine) may be prepared by condensing the corresponding mononitrile, dinitrile or trinitrile with dicyandiamide. The nitrile which reacts with the dicyandiamide must be a specific type of nitrile, namely, a nitrile whose molecule contains a cyano radical attached to a saturated carbon atom. In other words, the carbon atoms to which the cyano group is attached must not be unsaturated and must not become unsaturated under the reaction conditions. In a nitrile used in a reaction with dicyandiamide as described herein, a nuclear carbon atom in an aromatic ring structure (e. g., an atom in a benzene nucleus) is considered to be saturated.

A mononitrile or polynitrile which may be used in the preparation of a guanamine for use in the present invention may be the nitrile corresponding to a monocarboxylic acid or a polycarboxylic acid, for example, any normal aliphatic carboxylic acid in the series from acetic acid to octadecanoic acid, or in the series from malonic acid to octadecane 1,18-dicarboxylic acid, any benzene carboxylic acid, or an aromatic carboxylic acid containing two condensed benzene nuclei or two benzene nuclei connected directly or connected by from one to twelve atoms in series, a saturated or unsaturated alicyclic carboxylic acid, the dimer of linoleic acid, or an acid obtained by substituting the molecule of any of the foregoing acids substituents such as aliphatic, cycloaliphatic, aromatic, alkoxy, aryloxy and acyl radicals. Examples of such nitriles include acetonitrile, propionitrile, butyronitrile, valeronitrile, stearonitrile, succinonitrile, glutaronitrile, pimelonitrile, adiponitrile, sebaconitrile, azelaonitrile, octadecanedinitrile, benzonitrile, phthalonitrile, terephthalonitrile, cyanonaphthalene, dicyanonaphthalene, 2,4'-dicyanodiphenyl, 4,4' - dicyanodiphenyl methane, 4,4'-dicyanodiphenyl, 4,4'-dicyanodiphenyl ethane, 4,4'-dicyanoalphagamma-diphenyl propane, 4,4'-dicyanodiphenyl ether, 4-cyanophenyl 4-cyanobenzyl ether, 4,4'-dicyanodibenzyl ether, the ethers formed by the reaction of two molecules of a hydroxy benzonitrile (e. g., 4-hydroxy benzonitrile) with one molecule of the dibromide corresponding to a glycol in the series from methylene glycol to decylene glycol or to diethylene or triethylene glycol, gamma-methyl-gamma-acetylpimelonitrile, gamma-isopropenyl-gamma-acetylpimelonitrile, bis-cyanoethyl fluorene, 4,4'-dicyanobenzophenone, phenylacetonitrile, gamma-cyano-gamma-phenylpimelonitrile and the dinitrile corresponding to the dimer of linoleic acid.

In the preparation of a guanamine by the condensation of a nitrile with dicyandiamide, widely different molal proportions may be used. However, in the preparation of a monoguanamine the preferred proportion ranges from about 1 mol to about 1.5 mols of dicyandiamide for each mol of the nitrile (preferably a mononitrile) and the best results are obtained when the molal proportion is about 1.2 mols of dicyandiamide for each mol of the nitrile. In the preparation of a diguanamine the preferred proportion ranges from about 2.2 to about 2.6 mols of dicyandiamide for each mol of the nitrile (i. e., a dinitrile) and the best results are obtained by using about 2.4 mols of dicyandiamide for each mol of the nitrile. Correspondingly, in the preparation of a triguanamine the preferred proportion of dicyandiamide is slightly greater than 3 mols (i. e., about 3.6 mols) for each mol of the nitrile (i. e., a trinitrile).

The condensation of a nitrile with dicyandiamide is carried out by dissolving a strongly basic catalyst in a suitable primary or secondary alcoholic solvent such as benzyl alcohol or ethylene glycol mono-methyl ether, adding the nitrile and the dicyandiamide in a proportion within the range hereinbefore described, and heating to start the reaction. The reaction is then continued by heating or cooling if necessary to keep the temperature between about 100° and about 180° C. and to prevent the reaction from becoming too violent. The quantity of the alcoholic solvent used should be just sufficient to form a suspension of the precipitate that can be stirred during the reaction. When the precipitation of the guanamine is complete, the precipitate is filtered off and washed with boiling water to remove excess dicyandiamide and products of side reactions. The guanamine may be purified by converting it to a hydrochloride and neutralizing an aqueous solution of the hydrochloride to liberate the guanamine.

This method of preparation is versatile in that a large variety of nitriles may be used for the reaction with dicyandiamide, to give a wide variety of guanamines.

The nitriles may be prepared by various methods. Dinitriles in which the cyano groups are separated by five carbon atoms in series, and in which the central carbon atom of the series is disubstituted, may be prepared by condensing acrylonitrile and a compound having an active methylene group, in the presence of a strong base. Other dinitriles may be prepared by reacting a polymethylene dihalide with sodium cyanide. Often it is convenient to prepare the nitrile by dehydration of the amide or directly from the carboxylic acid.

Diguanamines in which one or two of the exocyclic nitrogen atoms are substituted, as for example, sym.-diphenyladipoguanamine, hereinbefore mentioned, may be prepared by various methods. One method consists in reacting 1-phenyl biguanide, 1-o-tolyl biguanide, 1-m-tolyl biguanide, 1-p-tolyl biguanide, 1-(2,5-dimethyl phenyl) biguanide, 1-methyl-1-phenyl biguanide, 1-p-phenethyl biguanide or 1-ethyl-1-phenyl biguanide with sodium carbonate and adipyl chloride or the dichloride of any other dicarboxylic acid in chlorobenzene. Another method consists in reacting any of the aforementioned aryl or alkyl aryl biguanides or 1-methyl biguanide, 1-ethyl biguanide, 1-propyl biguanide, 1-butyl biguanide, 1-allyl biguanide, 1-crotyl biguanide, 1,1-dimethyl biguanide, 1,1-diethyl biguanide or 1,1-diallyl biguanide, with the diethyl or dimethyl ester of adipic acid or any other dicarboxylic acid in the presence of an alkoxide catalyst. Still another method consists in reacting an alkyl or aryl dicyandiamide such as phenyl dicyandiamide with adiponitrile or the dinitrile of any other dicarboxylic acid.

A thermosetting heterocyclic polyamine-formaldehyde reaction product may be obtained by reacting a heterocyclic polyamine, as hereinbefore defined (or a mixture of such amines), either with formaldehyde or with a polymer thereof, such as paraformaldehyde. When used for this reaction, paraformaldehyde is considered to split up so that the substance actually taking part in the reaction is formaldehyde. The heterocyclic polyamine may be reacted with a solution of formaldehyde in water, in an organic solvent such as an alcohol, or in a liquid containing both water and an organic solvent.

A water solution is usually preferred. The reaction may be performed in an autoclave, if desired, to secure a reaction temperature above the boiling point of the solvent. Ordinarily, the heterocyclic polyamine is added to a commercial aqueous formaldehyde solution having a pH of about 4, or to such a solution which has been made less acid, or neutral, or alkaline, preferably at a pH between 6 and 8, by addition of any desired base, such as sodium hydroxide, ammonium hydroxide, borax or triethanolamine.

In general, the proportion of formaldehyde actually reacting may range from one-half to a maximum of two molecules for each amino group. An excess of formaldehyde above this maximum may be used for the reaction if desired, although an uncombinable excess of one of the reactants usually is not desirable in the final product. Because of the complexity of the molecules of the reaction products that are produced, the proportion of formaldehyde actually reacting may vary freely between the limits stated. The preferred proportions vary, of course, with the specific substance that is reacted with formaldehyde. For example, when the substance is melamine, the preferred proportions are about 3 mols of formaldehyde for each mol of melamine. Other examples of preferred molar ratios of formaldehyde to a heterocyclic polyamine in the preparation of a resinous reaction product for the coating of a fibrous silicate filler in the practice of the invention are 2:1 for guanazole or 1-carbamyl guanazole, 4:1 for 2,4-diamino-6-hydroxy pyrimidine, 3:1 for 2,4-diamine quinazoline, 2:1 for formoguanamine, acetoguanamine or benzoguanamine and 5:1 for adipoguanamine or sebacoguanamine.

The reaction proceeds at normal temperatures, but heating ordinarily is desirable to shorten the time of reaction, or, in some cases, to dissolve the substance to be reacted with formaldehyde. The desired resin solution ordinarily is obtained by carrying the reaction only to its earliest stage, for example, the stage at which the reacting ingredients have just dissolved to form a solution, or for a few additional minutes thereafter.

When the reaction between formaldehyde and a heterocyclic polyamine is substantially complete, the solution of the reaction product is used to coat a fibrous silicate filler by the procedure hereinafter described. The preferred heterocyclic polyamine in the practice of the invention is melamine, since a melamine-formaldehyde resin-coated filler imparts superior properties to molding compositions of the invention.

PREPARATION OF RESIN-COATED FILLER

For the sake of brevity, a fibrous silicate filler, as hereinbefore defined, which has been coated with a thermosetting reaction product of formaldehyde and a heterocyclic polyamine is hereinafter referred to as a "resin-coated filler." In the preparation of a resin-coated filler, a heterocyclic polyamine-formaldehyde reaction product solution, prepared as hereinbefore described, is diluted with water or any suitable solvent so that the volume of the resin solution is such that it may be used to deposit only a very small amount of the resin as a coating on the filler, the extent of the dilution varying, of course, with the procedure employed for applying the resin to the filler, as is hereinafter further discussed. The dilution should be made carefully so that the resin does not precipitate as the water is added. It is desirable that before dilution the pH of the resin solution be adjusted (e. g., with dilute lactic acid) so that it is on the slightly acid side, to prevent precipitation of methylols upon dilution and to promote condensation of the resin.

When the reaction product has thoroughly coated the fibrous silicate filler, it is desirable that the material be subjected to strong heating, since the heterocyclic polyamine-formaldehyde reaction product should be in at least a relatively advanced state of condensation. It is ordinarily desirable that the reaction product be in an infusible state, but at least the resin on the filler should be sufficiently condensed that neither water nor formaldehyde will be liberated during further processing operations in the preparation of a molding composition of the invention by the present method. Although the slightly acid pH of the coating solution may aid the cure initially, several hours of heating may be necessary at an elevated temperature to bring the resinous substance to a sufficiently advanced state of condensation (or to an infusible state in accordance with the preferred procedure). Any desired method may be used to coat the filler with the resin, so long as care is taken to avoid breakdown or wadding of the filler fibers. Of course, the preferred procedures are those which result in the least change in the physical characteristics of the filler. For example, the filler may be stirred into a highly dilute solution of the desired resin to form a slurry that can be readily atomized for spray drying or can be vacuum drum-dried. Alternatively, a dilute resin solution may be absorbed on the filler in a mixer and the resulting mass dried on trays at an elevated temperature (e. g., about 160 degrees F.). If desired, the dry product may be screened into several fractions to remove any fibers which may have become wadded or balled up during the coating process. However, such agglomerates ordinarily require hammer milling in order to break them up, and such a procedure may result in a considerable destruction of the fibers. A desirable procedure for coating the fibers of a fibrous silicate filler which produces very little harmful effect upon the physical characteristics of the fibers consists in stirring the filler into a dilute solution of the desired resin, allowing the slurry to stand for a short period of time (e. g., about fifteen minutes) and then filtering the slurry. The filter cake so obtained may then be dried and screened, and the screened fibers further dried.

The proportion of a heterocyclic polyamine-formaldehyde reaction product solution used to coat a fibrous silicate filler may vary with the specific reaction product and the specific type of silicate fibers employed, as well as with the degree of improvement in properties that is desired. Ordinarily, it is preferred that approximately 2 to 25 per cent of the final treated dry filler consist of the heterocyclic polyamine-formaldehyde reaction product (preferably in its infusible state), and it is most desirable that the proportion of the reaction product solution be such that from about 5 to about 15 per cent of the final coated filler consist of the reaction product. (The terms "per cent" and "parts" are used herein to mean per cent and parts by weight unless otherwise specified.)

If the heterocyclic polyamine used is one that reacts so rapidly with formalin that the reaction product reaches the insoluble stage almost immediately after the reactants are mixed and heated (guanazole is an example of such a heterocyclic polyamine) it is preferable simply to mix the polyamine and the formalin at room temperature and then to add the water of dilution, and the acid to adjust the pH. The relatively clear solution so obtained is then mixed with the fibrous silicate filler, which is thoroughly dried in accordance with any of the procedures hereinbefore described. In this case, the reaction between the heterocyclic polyamine and the formaldehyde actually takes place on the fibrous silicate filler during the drying operation.

POLYMERIZABLE UNSATURATED POLYESTER

In the preparation of a molding composition of the invention by the present method, a resin-coated fibrous silicate filler, prepared as hereinbefore described, is mixed with a polymerizable unsaturated polyhydric alcohol-polycarboxylic acid polyester.

A polymerizable unsaturated polyhydric alcohol-polycarboxylic acid polyester used in the practice of the invention is prepared by reaction of one or more polyhydric alcohols and one or more polycarboxylic acids having in the molecule at least one polymerizably reactive $\Delta^{2,3}$-enoyl group, having the structure

Thus, the polymerizable polyester is one having polymerizably reactive $\Delta^{2,3}$-enoyl groups contained in dioyl radicals (connecting polyhydric alcohol residues through ester linkages), which dioyl radicals may therefore be defined as $\Delta^{2,3}$-enedioyl radicals. The proportion of polyhydric alcohols having more than two hydroxy groups, such as glycerol or pentaerythritol, and the proportion of polycarboxylic acids having more than two carboxy groups, such as citric acid, preferably is small so that in the production of the polyester there may be maximum esterification of the hydroxy and carboxy groups without attainment of excessive viscosity (i. e., through cross-linking). For the purpose of the instant invention it is to be understood that the term "unsaturated polyester" means a polyester that is polymerizable into an infusible or high melting point resin; so the proportion of unsaturated components should be such that the polyester contains an average of at least three double bonds per molecule.

The present invention is applicable to all polymerizable unsaturated polyhydric alcohol-polycarboxylic acid polyesters. Preferably, the polyester is an ester of a glycol with a dicarboxy alkene having from four to five carbon atoms, in which the carboxy radicals are attached to adjacent carbon atoms (i. e., maleic, fumaric, itaconic, citraconic or mesaconic acid). However, as long as the $\Delta^{2,3}$-enoyl groups are polymerizably reactive, the polycarboxylic acid is not necessarily a hydrocarbon dicarboxylic acid but may contain any radicals (e. g., chloro groups) which do not render the $\Delta^{2,3}$-enoyl groups polymerizably non-reactive. The polyester may be an ester of a polycarboxylic acid with any glycol, such as any polymethylene glycol in the series from ethylene glycol to decamethylene glycol, propylene glycol, any butylene glycol, any polyethylene glycol, in the series from diethylene glycol to nonaethylene glycol, dipropylene glycol, any glycerol monobasic acid monoester (in either the alpha or beta position), such as monoformin or monoacetin, any monoether of glycerol with a monohydric alcohol, such as monomethylin or monoethylin, or any dihydroxy alkane in which the hydroxy radicals are attached to carbon atoms that are primary or secondary or both, in the series from dihydroxy butane to dihydroxy decane. Also the polyhydric alcohol used may be one whose molecule has two or three free hydroxy groups and consists of an ether of one or two molecules of allyl or methallyl alcohol with one molecule of a polyhydroxy compound such as glycerol, pentaglycerol, pentaerythritol, butantetrol-1,2,3,4, a trihydroxy normal alkane having from four to five carbon atoms such as butantriol-1,2,3, or a monoalkyl ether of pentaerythritol or butantetrol-1,2,3,4 in which the alkyl radical has from one to four carbon atoms and has from one to two hydrogen atoms attached to the same carbon atom as the ether linkage, such as the monomethyl or monoisobutyl ether or pentaerythritol.

Part of the unsaturated dicarboxylic acid may be replaced by a saturated dicarboxylic acid, such as any normal acid in the series from oxalic acid and malonic acid to sebacic acid, or any benzene dicarboxylic, napthalene dicarboxylic or cyclohexane dicarboxylic acid, or diglycolic, dilactic or resorcinol diacetic acid.

In the practice of the invention the preferred polymerizable unsaturated polyhydric alcohol-polycarboxylic acid polyesters are the so-called "linear" polyesters, i. e., those which have very little cross-linking in the polyester molecules, as evidenced by the fact that such polyesters are soluble in solvents such as acetone. Such polyesters are formed mainly by esterification of a dihydric alcohol and a dibasic acid. Of course, such polyesters are really only "substantially" linear since it is not possible to avoid all cross-linking, at least through the unsaturated bonds in the polyester molecules. In fact, a linear (or substantially linear) polyester may be obtained even though in the preparation of such polyester a small proportion of the dihydric alcohol (e. g., less than about 5 mol per cent of the alcohol) is replaced by a polyhydric alcohol containing more than two alcohol radicals, such as glycerol or pentaerythritol, or a small proportion of the dibasic acid (e. g., less than about 5 mol per cent of the acid) is replaced by a polybasic acid containing more than two acid radicals, such as citric acid. The preferred linear polyester for use in the practice of the invention is prepared by carrying out the esterification reaction substantially to completion (i. e., to an acid number of less than about 40) without permitting substantial (addition) polymerization to take place. Although the esterification reaction is usually carried out under an inert gas atmosphere so as to exclude oxygen, various inhibitors may be used to prevent appreciable polymerization of the polyester during the esterification reaction.

The molecular weight of polymerizable unsaturated polyesters for use in the practice of the invention may vary over a wide range, depending upon the initial reacting ingredients and upon the degree of reaction obtained in the preparation of the polyesters. A polyester used in the practice of the invention may have a molecular weight ranging from as low as about 500 to as high as about 5000, but ordinarily the molecular weights of preferred polymerizable unsaturated polyesters used in the present invention are in the lower portion of the range; for example, the molecular weight of a polyester prepared from ethylene glycol, maleic anhydride and small amounts of propylene glycol and phthalic anhydride usually is within the range from about 700 to about 2000.

The number of repeating units in a polymerizable unsaturated polyester chain, i. e., the number of acid and alcohol residues in the chain-like molecules of the polyester, may also vary, and polyesters having a high molecular weight have corresponding long chain molecules. In general, in a polymerizable polyester used in the practice of the invention the number of repeating units in the polyester chains may range from about 3 to about 25. However in preferred polyesters used in the present invention there are usually from about 4 to about 15 units in the polyester chains. Assuming that there is substantially no cross-linking in such polymerizable unsaturated polyesters and that equivalent quantities of, for example, glycol and maleic acid are employed, the number of olefinic unsaturations attached to carbon atoms in the chains of such polymerizable polyesters is, of course, merely the number of acid residues in the polyester chain. However, if part of the maleic acid is replaced by a saturated acid in the preparation of a polymerizable polyester, the number of olefinic unsaturations is lower in proportion to the amount of saturated acid employed, even though the number of acid and alcohol units in the chain remains about the same. Other properties of the unsaturated polyester, such as solubility in various solvents, also may be varied by selecting various reacting ingredients and varying their proportions. The infusibility, hardness and inertness of the product obtained by polymerization of the polyester may be increased by varying the initial reacting ingredients to increase the average number of olefinic double bonds per molecule of the polymerizable polyester.

In the preparation of the polymerizable unsaturated polyester, any of the usual modifiers such as monobasic acids, monohydric alcohols and natural resin acids may be added. The larger the proportions of monobasic acids and monohydric alcohols, the lower is the average number of acid and alcohol residues in the resulting polyester molecules, and the lower is the viscosity of the polyester. On the other hand, the more nearly equal the molecular proportions of dibasic acid and dihydric alcohol, the greater is the average number of residues in the resulting polyester molecules, and the greater is the viscosity. The proportions of ingredients used are those proportions that produce a polymerizable polyester of the desired viscosity. In the practice of the invention it is desirable that the proportion of monobasic acids and monohydric alcohols be kept low enough to allow substantial growth of the chain-like molecules during preparation of the unsaturated polyesters, since the presence of a substantial proportion of such monobasic acids and monohydric alcohols retards the chain growth of the polyesters and produces polyesters which are difficult to polymerize.

The effect of the addition of a small proportion of a monohydric alcohol or a monobasic acid upon the chain growth of a polyester is dependent to a great extent upon the degree of reaction attained before such a monofunctional acid or alcohol is added. For example, if added at the beginning of the reaction of a dibasic acid with a dihydric alcohol, each molecule of the monofunctional ingredient which reacts with a difunctional acid or alcohol stops the growth of that polyester chain in one direction so that long chain molecules of the polyester are difficult to obtain under such conditions. However, if added when the reaction of dibasic acid and dihydric alcohol is almost complete so that fairly long chains have already been built up, the monofunctional ingredient merely esterifies those end groups present in the existing polyester chains and, therefore, only a small amount may be incorporated in the polyester without having any deleterious effect upon the final product.

In the production of polymerizable unsaturated polyester compositions in the practice of the invention, the proportion of monohydric alcohol or monobasic acid used is never above about 10 mol per cent of the acid or alcohol content. Ordinarily the proportion of monohydric alcohol or monobasic acid that may be incorporated in polymerizable unsaturated polyesters for use in molding compositions of the invention is not more than about 5 mol per cent of the alcohol or acid content, although polyesters used in casting compositions occasionally may contain a slightly higher proportion of monofunctional ingredients. However, polymerizable unsaturated polyesters for use in the practice of the invention usually contain not more than about 2 mol per cent of monofunctional acid or alcohol in order that such polyesters may be readily polymerized into infusible or high melting point resins.

The point to which the reaction of the ingredients is carried in the preparation of the polymerizable polyester is simply that point at which the product has the desired consistency. The consistency or viscosity of the polyester (prepared by reaction under conditions which prevent any appreciable addition polymerization) varies directly with the average number of acid and alcohol residues in the molecule.

If desired, the reaction may be expedited by use of an acid substance as a catalyst. Any organic acid, inorganic acid or acid salt that is soluble in the reaction mixture may be employed as a catalyst, but it is desirable that any acid substance used be readily volatile or be of such a character that it has no deleterious effect in the final product. The amount of said catalyst employed is simply that amount which accelerates the esterification to the desired degree.

The reaction is carried out at a temperature high enough and for a time long enough to secure the desired consistency. An elevated temperature preferably is employed to expedite the reaction, but during the preparation of the polyester, the temperature should not be so high nor the time of reaction so long as to cause substantial polymerization. There is less danger of premature polymerization if an inhibiting agent is added before the esterification is carried out.

Whenever added, an inhibiting agent is used in the proportion required to give the desired degree of inhibiting effect. It may be necessary to use different inhibitors in widely different proportions in order to secure the same inhibiting effect.

Any desired anti-oxidant such as hydroquinone, pyrogallol, tannic acid or any aromatic amine, such as aniline or phenylene diamine may be employed as an inhibitor.

The preparation of the unsaturated polyester preferably is carried out in an atmosphere of an inert gas such as carbon dioxide, nitrogen or the like, in order to prevent cross-linking through addition polymerization as well as to prevent darkening or to make it possible to obtain a pale or colorless product. Bubbling the inert gas through the reacting ingredients is advantageous in that the gas serves the added functions of agitation and of expediting the removal of water formed by the reaction. Exclusion of oxygen is desirable not only because oxygen causes discoloration, but also because it tends to produce premature polymerization at the elevated temperatures used.

The acid number of the product depends upon the degree of reaction and the proportions of acid and alcohol used for the reaction. With equimolecular proportions of dibasic acid and dihydric alcohol, the reaction may be carried to an acid number of about 20. The use of an acid catalyst may make it possible to attain a lower acid number without substantial polymerization.

A polymerizable polyester may be prepared by the following procedure:

A three-necked flask is employed in which 5.4 mols of maleic anhydride and 5.4 mols of diethylene glycol are mixed together. The flask is then fitted with a thermometer, a tube leading to a condenser and an inlet tube through which is introduced a moderate stream of carbon dioxide, and is lowered into an oil bath at a temperature of 210° C. During the subsequent reaction the distillate may be analyzed, and a sufficient amount of the ingredient lost in excess may be added to the flask from time to time to maintain the initial proportions of reacting ingredients. If the only addition is a sufficient amount of the ingredient lost in excess to maintain the initial proportions, the rate of removal of unreacted ingredients gradually decreases and substantially no unreacted ingredients may be left in the composition at the end of the reaction. After 8 hours at such temperature, a polyester is obtained in the form of a stiff liquid having an acid number of 18. If ethylene glycol were substituted for the diethylene glycol in the foregoing procedure, it would be difficult to reduce the acid number below 40 without causing polymerization, and the product would be a very thick gum.

Alternatively, this first procedure, as described in the foregoing paragraph, may be employed except that 1.5 instead of 5.4 mols of maleic anhydride and 1.5 instead of 5.4 mols of diethylene glycol are used together with an amount of hydroquinone equal to 0.2 per cent of the weight of the reacting ingredients; and reaction is continued for 6¼ hours. The resulting polyester is a moderately stiff liquid having an acid number of 11.

A further procedure that may be used is the same as the first procedure except that 2 instead of 5.4 mols of maleic anhydride and 2.1 instead of 5.4 mols of diethylene glycol are used; and the reaction is carried out for 4½ hours to produce a stiff liquid having an acid number of 14.

Another type of polymerizable polyester may be prepared by a procedure that is the same as the first procedure except that 3 instead of 5.4 mols of maleic anhydride and 3.3 instead of 5.4 mols of diethylene glycol are used together with an amount of hydroquinone equal to .09 per cent of the weight of the reacting ingredients and an amount of p-toluene sulfonic acid equal to 0.18 per cent of the weight of the reacting ingredients; and the reaction is carried out for four hours at 200° C. to produce a stiff liquid having an acid number of 10.6.

As a further alternative, the first procedure may be employed except that the amount of maleic anhydride employed is 6 instead of 5.4 mols; the diethylene glycol is replaced by 6 mols of ethylene glycol; a slower stream of carbon dioxide is used; and the ingredients are kept in an oil bath at 220° C. for 5½ hours. The resulting polyester is a very thick gum having an acid number of 53.

A polymerizable polyester may also be prepared by a procedure that is the same as in the preceding paragraph except that the maleic anhydride is replaced by 5 mols of fumaric acid; the ethylene glycol is replaced by 5 mols of diethylene glycol; and the reaction is continued for 8¼ hours. The resulting polyester is a stiff liquid having an acid number of 23. If in the foregoing procedure the diethylene glycol were replaced by an equimolecular proportion of ethylene glycol and half of the fumaric acid were replaced by an equimolecular proportion of phthalic anhydride, the product would be a hard brittle solid. The substitution of fumaric acid for maleic anhydride increases the length of time required to reach a given acid number at a given temperature. However, the accelerating effect of an acid catalyst upon the esterification is greater when fumaric acid is used. When fumaric acid is employed, other conditions being the same, the resulting polyester tends to be more viscous and greater care is necessary in order to prevent premature polymerization.

As further variation, the first procedure may be used except that the maleic anhydride is replaced by 1.5 mols of fumaric acid; the amount of diethylene glycol employed is 1.5 instead of 5.4 mols; and the temperature is varied between 200 and 220° C. After the reaction has been continued for 2½ hours, the acid number is 73. After 6 hours, the product is a stiff liquid having an acid number of 41.

A polymerizable polyester may also be prepared by a procedure that is the same as that of the preceding paragraph except that p-toluene sulfonic acid (1.5 grams) is added to the initial ingredients; and reaction for only 2½ hours instead of 6 hours is required to produce a stiff liquid having an acid number of 41.

A procedure that may also be used is the same as that of the next to the last paragraph except that the fumaric acid is replaced by 3.3 mols of maleic anhydride; the amount of diethylene glycol used is 3.0 instead of 1.5 mols; 1.5 grams of p-toluene sulfonic acid and 1.3 grams of hydroquinone are added to the initial ingredients; and the reaction is carried out for 3 hours to produce a limpid liquid having an acid number of 26.

A polymerizable polyester may be prepared by a procedure that is the same as the next to the last paragraph except that 3 instead of 1.5 mols of fumaric acid and 3.3 instead of 1.5 mols of diethylene glycol are used; and the reaction is carried out for 3 hours at temperatures ranging from 200–210° C. to produce a stiff liquid having an acid number of 12.

A further procedure that may be used is the same as that of the next to the last paragraph except that the hydroquinone is omitted; and reaction for 5 hours is required to produce a stiff liquid having an acid number of 28.

Another procedure that may be used is the same as the procedure of the next to the last paragraph except that the weight of p-toluene sulfonic acid is equal to 0.18 per cent of the weight of the reacting ingredients; an amount of hydroquinone equal to 0.09 per cent of the weight of the reacting ingredients is added at the start of the reaction; and reaction is carried out at 200° C. for 5 hours to produce a stiff liquid which has an acid number of 10.1.

Polymerization of these materials usually is carried out at temperatures of about 180 degrees to about 210 degrees F. A solution comprising one or more polymerizable unsaturated polyesters and a substance (or mixture of substances) having at least one polymerizably reactive $CH_2=C<$ group per molecule and having a boiling point above 80 degrees C. is particularly useful as a binder in the production of a molding composition of the invention in accordance with the present method. Although the latter substance may be partially polymerized before use, it is preferable that such substance be a monomer and it is desirable that such substance have a plurality of polymerizably reactive $CH_2=C<$ groups per molecule, the preferred $CH_2=C<$ groups being allyl groups. It is preferred also that such substance be copolymerizable with the unsaturated polyester used. Such substances which are copolymerizable with a polymerizable unsaturated polyester include, styrene, o-methyl styrene, methyl methacrylate, methyl acrylate, vinyl acetate, diallyl phthalate, diallyl oxalate, diallyl diglycolate, triallyl citrate, carbonyl bis-(allyl lactate), maleyl bis-(allyl lactate), fumaryl bis-(allyl lactate), succinyl bis-(allyl lactate), adipyl bis-(allyl lactate), sebacyl bis-(allyl lactate), phthalyl bis-(allyl lactate), fumaryl bis-(allyl glycolate), carbonyl bis-(allyl glycolate), carbonyl bis-(allyl salicylate), tetra-(allyl glycolate) silicate, and tetra-(allyl lactate) silicate.

PREPARATION OF MOLDING COMPOSITIONS

A molding composition of the invention produced in accordance with the present method comprises, as a binder, a polymerizable unsaturated polyester (or solution thereof) of the type hereinbefore described and, as a filler therefor, a resin-coated fibrous silicate filler (as hereinbefore described). A catalyst for the polymerization of the polyester is ordinarily present in a molding composition of the invention, along with the usual additives such as molding lubricants, plasticizers and coloring matter, the amount used in the case of each of such additives being the usual amount consistent with its particular function in the molding composition.

The mixing of a resin-coated fibrous silicate filler with a polymerizable unsaturated polyester in accordance with the present method may be carried out by any of the known procedures. If the polyester is very viscous, it may be necessary to incorporate the resin-coated fibrous silicate filler in the polyester on a heated two-roll (differential speed) rubber mill, or it may be desirable to heat the polyester in order to reduce the viscosity sufficiently to permit the use of other mixing procedures. Ordinarily, the viscosity of the polyester is such that the kneading or equivalent mixing procedures may be used satisfactorily. In some cases it may be desirable to dilute the polyester with a solvent in order to facilitate mixing with the resin coated fibrous silicate filler.

The function of the polyester is that of a binder, and accordingly the proportion of the resin-coated fibrous silicate filler in a molding composition embodying the invention may range from a very small proportion such as about 5 per cent to a very high proportion such as about 75 per cent. In general, the preferred range is from about 60 per cent to about 70 per cent of the resin-coated fibrous silicate filler in the molding composition, and the best all-round results are obtained in the upper portion of such range.

Although a resin-coated fibrous silicate filler may be the sole filler in a molding composition of the invention, it is preferable that the composition comprise, as a filler, a mixture of kaolin (i. e., Georgia clay) and the resin-coated fibrous silicate filler. When the filler in a molding composition of the invention comprises a mixture of kaolin and a resin-coated fibrous silicate filler, the composition yields molded articles having not only the improved water resistance and electrical properties hereinbefore described, but also an added improvement in hardness, strength and surface finish. In other words, a filler comprising a combination of the resin-coated silicate fibers and kaolin (which is non-fibrous) is capable of imparting to a polymerized unsaturated polyester all of the improvements which the resin-coated silicate fibers alone impart, and in addition certain other substantial improvements. Moreover, kaolin is less expensive than any of the fibrous silicates, and, therefore, a substantial economic advantage is obtained in the use of kaolin in combination with a resin-coated fibrous silicate filler. A preferred form of kaolin for use in the invention is a commercial product known as "Georgia clay" (e. g., "Witco Ideal" available from Witco Chemical Company). The use of kaolin in a composition of the invention also imparts greatly improved flowing characteristics to the polyester during molding. Kaolin and the resin-coated silicate fibers may be incorporated in the polymerizable polyester separately or they may be mixed together first and then incorporated in the polyester. In either case, any of the means hereinbefore described for the incorporation of a resin-coated fibrous silicate filler may be used in order to obtain a mixture of such materials in the polyester, as a filler therefor.

The proportion of the foregoing mixture in a molding composition embodying the invention is within the range hereinbefore described for a resin-coated fibrous silicate filler used alone, and, likewise, the preferred range is from about 60 per cent to about 70 per cent of the molding composition. At least an appreciable amount of both kaolin and the resin-coated silicate fibers is used in such a mixture in order to obtain the benefit of the improvements which are imparted by each type of filler. As a rule, the proportion of kaolin to silicate fibers in the mixture may range from the minimum proportion at which the effect of kaolin is noticeable (i. e., about 1:100) to the maximum proportion at which the effect of the resin-coated silicate fibers is noticeable (i. e., about 6:1), the preferred proportions being in the upper portion of the range, for economic reasons. The optimum results are obtained at a kaolin to resin-coated silicate fiber ratio ranging from about 1:1 to about 2:1.

The use of certain alkaline compounds in combination with resin-coated silicate fibers (or a mixture thereof with kaolin) may enhance the improvement in electrical properties and water resistance that is obtained in articles molded from compositions of the invention produced by the present method. Such an alkaline compound is a base formed of a metal of group II of the periodic system, i. e., calcium, barium, strontium, magnesium, zinc, cadmium or mercury. It is believed that beryllium and radium are too rare and expensive to be considered, and, accordingly, the metals of group II having atomic weights between 10 and 220 are the metals from which the base is formed that may be used as part of the filler in the practice of the invention.

A metal base may be defined as a compound which reacts with an acid to replace the "acid" hydrogen atom with the metal cation of the metal base, thereby forming the metal salt of such acid. Such a definition necessarily makes the meaning of the term "metal base" dependent, in part at least, upon the acid present. It is to be understood that the base of a metal of group II (as referred to herein) is one that is in fact a metal base with respect to the polymerizable polyester, which is present in the practice of the invention. In other words, the metal base is a compound which releases its cation to replace the hydrogen of the carboxy radicals in the polymerizable polyester. Presumably, such a carboxy radical acts as an acid in that it displaces acids weaker than itself from their salts, but does not displace acids stronger than itself from their salts. However, the term "metal base" does not include those metal salts, such as zinc stearate, which are used as lubricants or other modifiers in a polyester resin, because the salts of such long chain (i. e., over 6 carbon atoms) carboxylic acids apparently are not reactive enough to release the metal cation to replace the hydrogen of the carboxy radicals.

It has been found that the metal base used in the practice of the invention must be the substitution product of a substance with a labile hydrogen atom, having a dissociation constant (for the hydrogen) at least as small as about $3 \times 10^{-7}$, in which the labile hydrogen atom has been replaced by a valence of a metal of group II. In other words, in order that a compound of such a metal may be basic, it must be a compound of such a metal with a substance having a dissociation constant (for the labile hydrogen atom) equal to or less than that of carbonic acid. The most common examples of such metal bases include the oxides, hydroxides, borates, carbonates, and alcoholates such as the methoxides and ethoxides of such metals. It is usually desirable to use a metal base which does not release a volatile material upon neutralization, and therefore, a metal base such as an oxide is preferred in the practice of the invention. Particularly good results are obtained using zinc oxide in the practice of the invention.

The full benefit of the use of the metal base in the practice of the invention is obtained simply by incorporating the metal base in the polyester in the same manner as any filler, i. e., according to the procedures hereinbefore described for incorporating the resin-coated silicate fibers and kaolin. The metal base may be incorporated in the polyester alone or as a mixture with the fillers hereinbefore mentioned. In fact, although the metal base has several chemical functions, it also functions physically as a part of the filler, i. e., in determining the total amount of filler used the amount of the metal base is added to the amount of the resin-coated silicate fibers (and kaolin). Accordingly, the proportion of the total filler used in the practice of the invention is within the range hereinbefore described and the preferred range is from about 60 per cent to about 70 per cent of the polyester composition.

The proportion of the metal base used may range from a minimum proportion depending on the chemical function of the metal base (i. e., at least a bare excess over the amount necessary to neutralize the polyester in the composition so that such composition will, in fact, contain some of the metal base) to a maximum proportion depending on the physical function of the (non-fibrous) metal base (i. e., the maximum proportion at which the effect of the resin-coated silicate fibers is noticeable, which is a metal base to silicate fiber ratio of about 6:1).

In the practice of the invention it is preferable to include kaolin also as a part of the filler and since kaolin is non-fibrous, the ratio of the maximum amount of kaolin plus the metal base to the resin-coated silicate fibers used is the same as the ratio of the maximum amount of kaolin or metal base to resin-coated silicate fibers used (i. e., about 6:1). The preferred proportion of the metal base ranges from about 2 per cent to about 20 per cent of the total filler.

In the practice of the invention a solution comprising one or more polymerizable unsaturated polyesters and one or more polymerizable monomeric compounds (i. e., monomeric substances having at least one $CH_2=C<$ group per molecule and having a boiling point above 80° C.) is particularly advantageous, because the polyester has desirable physical properties and hardens very rapidly, whereas, the presence of the monomeric compound causes the polymerized product to be much more water resistant and insoluble. Moreover, the combination (solution) of the polyester and the monomeric compound usually polymerizes much more rapidly than either of such substances alone. Such a solution usually contains about 5 to about 35 per cent of the polymerizable monomeric compound and about 95 to about 65 per cent of the polymerizable polyester.

Since the polymerizable polyester is fusible and plastic at relatively low temperatures, it is possible to adjust the amounts of catalysts and inhibiting agents so that the hardening at such temperatures takes place at a reasonable rate to allow ample opportunity for shaping and molding of the composition. In this manner molding compositions may be produced which are fast curing, gas free and adapted to complicated moldings (e. g., clock cases).

The preferred catalyst for use in the practice of the invention is benzoyl peroxide, but any other organic peroxide (not containing polymerization-inhibiting radicals), such as succinyl peroxide, t-butyl perbenzoate, di-t-butyl perphthalate, acetyl peroxide, peracetic acid, perbenzoic acid, toluoyl peroxide, acetyl benzoyl peroxide, diacetyl peroxide and furoyl peroxide; or any organic ozonide (not containing polymerization-inhibiting radicals), such as di-isopropylene ozonide or di-isobutylene ozonide, or a mixture of such substances, may be used as the curing catalyst.

The proportion of curing catalyst used in the practice of the invention is simply the proportion that causes the composition to polymerize at the desired rate, and, as the term "catalyst" implies, such proportion is the usual catalytic amount, i. e., ranging from about 0.01 per cent to about 5 per cent of the composition. The preferred proportion of curing catalyst varies with different catalysts, and the amount of any curing catalyst required to produce a given rate of hardening may vary also with variations in the nature of the polymerizable composition. For example, a polyester prepared from maleic anhydride and diethylene glycol, when used in a molding composition of the invention containing about 3 per cent of benzoyl peroxide, cures at approximately the same rate as a similar polyester prepared from fumaric acid and diethylene glycol in which the proportion of benzoyl peroxide is about 0.5 per cent.

If the binder used in the practice of the invention comprises a viscous polymerizable substance and a less viscous polymerizable substance, the polymerization catalyst may be dissolved in the less viscous polymerizable substance before the two substances are mixed. On the other hand, it is often desirable to disperse the polymerization catalyst in the resin-coated silicate fibers by grinding with the fibers in a ball mill, for example, before the fibers are mixed with the polyester. In some cases the resin-coated silicate fibers may be mixed with a solution of the polymerization catalyst in a volatile solvent and dried before the fibers are mixed with the polyester.

As hereinbefore demonstrated, articles molded from a molding composition of the invention have superior water resistance and electrical properties. The strength properties of articles molded from a composition of the invention are, in general, approximately the same as the strength properties of an article molded from a polymerizable unsaturated polyester composition which comprises an ordinary untreated fibrous silicate filler. This is evident from the comparison of the strength test results on bars (½" x ⅜" x 1") molded from compositions A, A₁, A₂, A₃ and A₄ (prepared as hereinbefore described) with those of bars molded from control composition B (hereinbefore described), as shown in Table 3 below. The strength tests employed are standard tests for plastic materials and are considered to be capable of showing generally the strength characteristics that are important in industrial plastic materials. The flexural and compressive strengths and the flexural moduli of the molded articles, determined from the deflection of the molded articles while pressure is applied, are shown in columns 2, 3 and 4.

TABLE 3

| Composition | Flexural p. s. i. | Compressive p. s. i. | Flexural Modulus (10)⁶ |
| --- | --- | --- | --- |
| B (control) | 10,000 | 23,300 | 2.12 |
| A | 9,300 | 24,300 | 2.69 |
| A₁ | 10,200 | 27,600 | 2.47 |
| A₂ | 9,750 | 25,600 | 2.23 |
| A₃ | 8,400 | 20,900 | 2.04 |
| A₄ | 7,200 | 21,500 | 2.06 |

The following examples illustrate the practice of the invention.

Example 1

A reaction mixture of a heterocyclic polyamine (58 grams of melamine), formalin (111.5 grams) and water (1830 grams) is heated to 80 degrees C. and held at that temperature for ten minutes. The pH is then adjusted to 7.0 (with dilute lactic acid) and the solution is cooled to 60 degrees C. A fibrous silicate filler (125 grams of anthophyllite fibers) is then stirred into the solution and the mixture is allowed to stand for fifteen minutes, before filtering. The resulting filter cake is then dried at 180 degrees F. for two hours and screened. The screened fibers (size "on 12") are further dried at 220 degrees F. for sixteen hours. The resin-coated fibers so obtained are mixed in a Banbury mixer with a polymerizable binder, consisting of 114.3 parts of a polymerizable unsaturated polyester (prepared by esterifying 1.0 mol of ethylene glycol with 0.2 mol of phthalic anhydride and 0.8 mol of maleic anhydride by the procedure hereinbefore described to an acid number of 35) and 44.4 parts of a polymerizable unsaturated liquid monomer (diallyl phthalate), 6.35 parts of "Luperco ATC," 10 parts of a lubricant (zinc stearate); and 235 parts of kaolin. The mixing is continued until a soft, homogeneous dough is obtained. The material is then passed through warm rubber rolls to form sheets of a thickness of approximately ⅛ inch. The composition so obtained can be molded to produce articles having superior water resistance and electrical properties. For example, superiority in water resistance is evident from the results obtained (tabulated below) when samples of the sheets are molded into disks and tested for water resistance by the procedure hereinbefore described. For the sake of comparison, the results obtained with control composition B, prepared as hereinbefore described using ordinary untreated anthophyllite fibers, are repeated below (in parentheses).

| | | |
|---|---|---|
| Boiling water absorportion, 1 hour | .036 | (.057) |
| Barcol Hardness (original) | 66 | (65) |
| Barcol Hardness (after boiling) | 55 | (48) |
| Cold Water Absorption (24 hrs.) | .013 | (.029) |
| Cold Water Absorption (48 hrs.) | .023 | (.043) |
| Cold Water Absorption (7 days) | .047 | (.088) |

Example 2

A reaction mixture of a heterocyclic polyamine (109 grams of melamine), formalin (210 grams) and water (400 grams) is heated to a temperature of 80 degrees C. As soon as a clear solution is obtained, the pH is adjusted to 6.7 by adding lactic acid (0.7 cc. of a 10 per cent solution), and the reaction is continued for a total time of ten minutes. The resin solution is then cooled to 60 degrees C. and diluted with water (3200 grams). The resulting dilute solution is absorbed on a fibrous silicate filler (2093 grams of anthophyllite fibers) in a Hobart mixer, and the resulting coated fibers are dried on trays at 160 degrees F. for approximately 48 hours. The resin-coated fibers (1500 grams) are mixed in a Banbury mixer with a polymerizable binder, consisting of 1191.5 grams of a polymerizable unsaturated polyester (prepared by esterifying a charge of 1.0 mol of maleic anhydride, 0.85 mol of monoethylene glycol, 0.2 mol of propylene glycol and an amount of hydroquinone equal to 0.06 per cent of the charge, by the procedure hereinbefore described, to an acid number of about 30) and a polymerizable unsaturated liquid monomer (132 grams of diallyl phthalate), a catalyst (26.5 grams of t-butyl perbenzoate); zinc oxide (250 grams); kaolin (1900 grams); and a lubricant (100 grams of zinc stearate). The mixing is continued until a soft, homogeneous dough is obtained. The material is then passed through warm rubber rolls to form sheets of a thickness of approximately ⅛ inch. The sheets are allowed to solidify fully while at a temperature between 80 and 90 degrees F. and are then granulated in a high speed cutter to a maximum particle diameter of about ⅛ inch. The granulated composition can be molded to produce articles having superior water resistance and electrical properties. For example, samples of the granulated composition are molded into disks and tested for water resistance by the procedure hereinbefore described, and the results obtained are tabulated below. A second molding composition is prepared by the procedure described above, except that the resin-coated fibers are replaced by an equal weight of ordinary, untreated anthophyllite fibers. For the sake of comparison, the results obtained when this control composition is molded and tested for water resistance are also included below (in parentheses).

| | | |
|---|---|---|
| Boiling water absorption, 1 hour | .035 | (.035) |
| Barcol Hardness (original) | 59 | (58) |
| Barcol Hardness (after boiling) | 47 | (39) |
| Cold Water Absorption (24 hrs.) | .015 | (.025) |
| Cold Water Absorption (48 hrs.) | .020 | (.035) |
| Cold Water Absorption (7 days) | .035 | (.080) |

The resistance to hydrolysis of articles molded from compositions of the invention is so superior that such articles show better retention of electrical properties after exposure to high humidity than articles molded from the compositions which comprises ordinary, untreated anthophyllite fibers. For example, this may be seen in the comparison of the retention of insulation resistance properties of disks molded from the granulated composition of the invention prepared as described above (tabulated below) with such properties of disks molded from the control composition prepared as described above (tabulated below in parentheses). In an accelerated test used to determine the retention of insulation resistance of molding compositions the polymerized compositions are exposed to high relative humidities and high temperatures for prolonged periods of time to promote the breakdown of their insulation resistance. The insulation resistance is determined by measuring the resistance (in megohms) offered to the flow of a current when a voltage is impressed between two electrodes so embedded in a molded article that there is a distance of 1¼ inches between the centers of the electrodes. The results tabulated below are obtained on molded articles exposed to a temperature of 160 degrees F. and a relative humidity of 95 per cent for the periods of time given below and the insulation resistance is tested after exposure of the samples to such conditions. The initial insulation resistance of each sample is over one million megohms.

| | | |
|---|---|---|
| 1 day | meg | 11,600 (500) |
| 3 days | meg | 330 (12) |
| 7 days | meg | 38 (5.5) |
| 16 days | meg | 14 (2.8) |

Example 3

A molding composition of the invention is prepared by the procedure described in Example 1 except that zinc oxide (25 parts) is used, the proportion of the resin-coated anthophyllite fibers is 100 parts and the proportion of kaolin is 210 parts. The composition so obtained can be molded to produce articles having water resistance and electrical properties that are superior to such properties of a control composition which is similar except that ordinary anthophyllite is used instead of the resin-coated anthophyllite fibers. This is evident from the results obtained and tabulated below when samples of sheets of each composition are molded into disks and tested for water resistance and insulation resistance by the procedures hereinbefore described. (The results obtained on the control composition are given below in parentheses.)

| | | |
|---|---|---|
| Abs. boiling water, 1 hr | .038 | (.048) |
| Abs. cold water, 24 hrs | .019 | (.025) |
| Abs. cold water, 48 hrs | .028 | (.038) |
| Abs. cold water, 7 days | .053 | (.073) |
| Insulation Resistance: | | |
| 3 days meg | 12,500 | (2,800) |
| 7 days meg | 2,300 | (450) |
| 14 days meg | 750 | (300) |

In the preceding examples, similar good results are obtained when an equal weight of a resin-coated fibrous silicate filler prepared by one of the following procedures is used in place of the resin-coated anthophyllite fibers prepared as described above.

(a) A reaction mixture of a heterocyclic polyamine (9.0 parts of melamine), formalin (17.4 parts) and water (206.6 parts) is heated to 80° C. and held at that temperature for ten minutes, the pH being adjusted to 6.8 to 7.0 with dilute lactic acid as soon as a clear solution is obtained. The resulting resin solution is then cooled to 60° C. and is further diluted with warm water to 2500 parts before stirring in one of the fibrous silicate fillers hereinbefore described e. g., anthophyllite, wollastonite or tremolite fibers (188 parts). The resulting slurry is spray dried to form a resin-coated fibrous silicate filler.

(b) A reaction mixture of a heterocyclic polyamine (17 parts of benzoguanamine) and formalin (17.4 parts) is heated to the boiling point. After the reaction mixture has boiled for about three minutes, substantially all of the benzoguanamine is dissolved and the hot solution is then diluted with methanol (80 parts) and water (100 parts) to obtain a clear solution having a pH of about 6.8 to 7.0. The resulting resin is cooled before adjusting the pH to 6.0 with dilute lactic acid, and is then diluted and used to coat a fibrous silicate filler by the procedure described in (a).

(c) A reaction mixture of a heterocyclic polyamine (10 parts of adipoguanamine), formalin (17.4 parts), water (100 parts) and ethylene glycol monomethylether (25 parts) is refluxed for about twenty minutes at a temperature of about 100 degrees C. to obtain a clear, water-soluble resin having a pH of about 6.8. The resulting resin is cooled; the pH is adjusted to about 6.0 by addition of dilute lactic acid; and the solution is then diluted and used to coat a fibrous silicate filler by the procedure described in (a).

Having described the invention, I claim:

1. A method of producing a molding composition that gives molded articles having improved water resistance and electrical properties, which comprises coating a filler comprising fibers of crystalline fibrous silicates consisting essentially of anhydrous silicates of divalent metals with a thermosetting reaction product of formaldehyde and a substance whose molecule has a plurality of $NH_2$ groups each connected to a carbon atom contained in a heterocyclic ring consisting of carbon and nitrogen atoms, the carbon atom being connected by a double bond to an intracyclic nitrogen atom, and then mixing the coated filler with a polymerizable olefinically unsaturated polyhydric alcohol-polycarboxylic acid polyester.

2. A method as claimed in claim 1 wherein the substance is melamine.

3. A method as claimed in claim 2 wherein the filler to be coated comprises amphibole fibers consisting essentially of silicates of divalent metals.

4. A method of producing a molding composition that gives molded articles having improved water resistance and electrical properties, which comprises coating a filler comprising pyrobole fibers consisting essentially of silicates of divalent metals with a thermosetting reaction product of formaldehyde and a substance whose molecule has a plurality of $NH_2$ groups each connected to a carbon atom contained in a heterocyclic ring consisting of carbon and nitrogen atoms, the carbon atom being connected by a double bond to an intracyclic nitrogen atom, and then mixing the coated filler with a polymerizable olefinically unsaturated polyhydric alcohol-polycarboxylic acid polyester.

5. A molding composition that gives molded articles having improved water resistance and electrical properties, comprising (a), as a binder, a polymerizable olefinically unsaturated polyhydric alcohol-polycarboxylic acid polyester and (b), as a filler therefor, fibers of crystalline fibrous silicates consisting essentially of anhydrous silicates of divalent metals, the fibers being coated with a thermosetting reaction product of formaldehyde and a substance whose molecule has a plurality of $NH_2$ groups each connected to a carbon atom contained in a heterocyclic ring consisting of carbon and nitrogen atoms, the carbon atom being connected by a double bond to an intracyclic nitrogen atom.

6. A molding composition that gives molded articles having improved water resistance and electrical properties, comprising (a), as a binder, a polymerizable olefinically unsaturated polyhydric alcohol-polycarboxylic acid polyester and (b), as a filler therefor, fibers of crystalline fibrous silicates consisting essentially of anhydrous silicates of divalent metals, the fibers being coated with a thermosetting reaction product of formaldehyde and melamine.

7. A molding composition that gives molded articles having improved water resistance and electrical properties, comprising (a), as a binder, a polymerizable olefinically unsaturated polyhydric alcohol-polycarboxylic acid polyester and (b), as a filler therefor, amphibole fibers consisting essentially of silicates of divalent metals, the fibers being coated with a thermosetting reaction product of formaldehyde and melamine.

8. A molding composition that gives molded articles having improved water resistance and electrical properties, comprising (a), as a binder, a polymerizable olefinically unsaturated polyhydric alcohol-polycarboxylic acid polyester and (b), as a filler therefor, pyrobole fibers consisting essentially of silicates of divalent metals, the fibers being coated with a thermosetting reaction product of formaldehyde and a substance whose molecule has a plurality of $NH_2$ groups each connected to a carbon atom contained in a heterocyclic ring consisting of carbon and nitrogen atoms, the carbon atom being connected by a double bond to an introcyclic nitrogen atom.

9. A molding composition that gives molded articles having improved water resistance and electrical properties, comprising (a), as a binder, a polymerizable olefinically unsaturated polyhydric alcohol-polycarboxylic acid polyester and (b), as a filler therefor, kaolin and fibers of crystalline fibrous silicates consisting essentially of anhydrous silicates of divalent metals, the fibers being coated with a thermosetting reaction product of formaldehyde and a substance whose molecule has a plurality of $NH_2$ groups each connected to a carbon atom contained in a heterocyclic ring consisting of carbon and nitrogen atoms, the carbon atoms being connected by a double bond to an introcyclic nitrogen atom.

10. A molding composition as claimed in claim 5 wherein the filler comprises anthophyllite fibers.

11. A molding composition as claimed in claim 5 wherein the filler comprises tremolite fibers.

12. A molding composition as claimed in claim 5 wherein the filler comprises wollastonite fibers.

13. A molding composition as claimed in claim 5 wherein the filler comprises actinolite fibers.

References Cited in the file of this patent

UNITED STATES PATENTS

| Number | Name | Date |
|---|---|---|
| 2,439,929 | Hill et al. | Apr. 20, 1948 |
| 2,549,732 | Weaver | Apr. 17, 1951 |